United States Patent
Campbell

(10) Patent No.: US 6,411,493 B2
(45) Date of Patent: Jun. 25, 2002

(54) APPARATUS FOR GENERATING THRUST USING A TWO DIMENSIONAL, ASYMMETRICAL CAPACITOR MODULE

(75) Inventor: Jonathan W. Campbell, Harvest, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/961,552

(22) Filed: Sep. 20, 2001

Related U.S. Application Data

(63) Continuation-in-part of application No. 09/520,817, filed on Mar. 8, 2000, now Pat. No. 6,317,310.

(51) Int. Cl.⁷ .............................................. H01G 4/228
(52) U.S. Cl. ..................................... 361/306.1; 361/811
(58) Field of Search .............................. 361/306.1, 15, 361/16, 17, 715, 821, 311

(56) References Cited

U.S. PATENT DOCUMENTS 5,107,393 A * 4/1992 Lobo ........................ 361/306.1

* cited by examiner

*Primary Examiner*—Anthony Dinkins
(74) *Attorney, Agent, or Firm*—James J. McGroary

(57) ABSTRACT

An asymmetrical capacitor module for generating thrust includes two conductive elements of similar but different geometries separated by a dielectric member. Improved embodiments provided in the construction of conductive elements of smaller axial extent include those where the element is formed by an annular wire or a dielectric supported ring. Other embodiments concern the dielectric member and involve changes in the extent and shape thereof.

16 Claims, 4 Drawing Sheets

APPARATUS FOR GENERATING THRUST USING A TWO DIMENSIONAL, ASYMMETRICAL CAPACITOR MODULE

CROSS REFERENCE TO RELATED APPLICATIONS

This application is a continuation-in-part of U.S. application Ser. No. 09/520,817, filed on Mar. 8, 2000 now U.S. Pat. No. 6,317,310.

ORIGIN OF THE INVENTION

This invention was made by an employee of the United States Government and may be manufactured and used by or for the Government for Governmental purposes without the payment of royalties.

BACKGROUND OF THE INVENTION

1. Field of Invention

The present invention relates to methods and apparatus which use capacitors charged to high potentials for generating thrust and, more particularly, to an improved apparatus using a two dimensional, asymmetrical capacitor to which a high potential is applied.

2. Background of the Invention

It is well established in the literature, that a force or thrust may be generated by a capacitor charged to a high potential. Although there are different theories regarding the basis for this phenomenon, there is no dispute that a force is generated by capacitors under such high voltages. However, the thrust generated by such high potential capacitors has been minimal and thus this phenomenon has had very limited practical utility.

In the above-identified application, there is disclosed a capacitor module system for creating a thrust. The system includes a capacitor module comprising a first conductive element having a cylindrical geometry; a second conductive element which is axially spaced from the first conductive element and which is of a geometry having a smaller axial extent than the first conductive element; and a dielectric element disposed between the first conductive element and the second conductive element so as to form the capacitor module. A high voltage source, having first and second terminals connected respectively to the first and second conductive elements is used to apply a high voltage to the conductive elements of sufficient value to create a thrust force on the module to thereby induce movement thereof. As disclosed in that application, in preferred embodiments, the first conductive element can comprise a solid cylinder or a hollow cylinder. The second conductive element can comprise a disk, a domed element, or a tip at the end of a dielectric rod. The system may further include a plurality of circumferentially disposed, spaced dielectric rods which interconnect the dielectric element and the second conductive element.

Although the asymmetrical capacitor module described in the preceding paragraph has worked well in the laboratory, one potential disadvantage or limitation thereof is that there is some tendency to arcing between potential surfaces. More generally, there is a need to further improve the module construction to enable use thereof for atmospheric propulsion and for propulsion in space.

SUMMARY OF THE INVENTION

In accordance with the invention, an asymmetrical capacitor module is provided which affords important advantages over those disclosed in the above-identified application, particularly in the areas of performance, weight reduction and arcing between conductive surfaces.

In accordance with a first aspect of the invention, a capacitor module system is provided for creating a thrust force, the system comprising: a capacitor module comprising a first conductive element having a first geometry; a second conductive element axially spaced from the first conductive element and having a geometry of smaller axial extent than the geometry of the first conductive element; and a dielectric element disposed between the first conductive element and the second conductive element so as to form the capacitor module; and, a high voltage source, having first and second terminals connected respectively to said first and second conductive elements, for applying a high voltage to the conductive elements of sufficient value to create a thrust force on the module inducing movement thereof, the second conductive element having a diameter substantially equal to that of the first conductive element and being of a shape defining a plane as viewed in axial cross section while being of reduced weight compared with a copper disk of the same diameter and shape.

In one preferred embodiment, the second conductive element comprises an insulator including a plurality of conductive elements therein.

In another preferred embodiment, the second conductive element comprises a circular conductive wire member.

In yet another preferred embodiment, the second conductive element comprises a cup-shaped conductive member having a recessed central portion.

In still another preferred embodiment, the second conductive element comprises an annular conductive member disposed within an outer dielectric annulus. Advantageously, the second conductive element further includes a central disk-shaped dielectric member.

In one preferred implementation, the first conductive element is of a cylindrical shape.

In another preferred embodiment, the apparatus further comprises a central dielectric support strut for supporting the second conductive element in spaced relation to the dielectric element.

According to a further aspect of the invention, a capacitor module system is provided for creating a thrust force, wherein the system comprises: a capacitor module comprising a cylindrical dielectric member having an outer surface; a first conductive element disposed on the outer surface of said dielectric member and having a cylindrical geometry; a second conductive element disposed on said dielectric member in axially spaced relation to said first conductive element so as to form the capacitor module and having a cylindrical geometry of smaller axial extent than said first conductive element; the dielectric member extending axially beyond the first conductive element at one end of said dielectric member and extending axially beyond said second conductive element at the opposite end of said dielectric member; and a high voltage source, having first and second terminals connected respectively to said first and second conductive elements, for applying a high voltage to said conductive elements of sufficient value to create a thrust force on the module thereby inducing movement thereof.

In an important implementation that reduces arcing, the dielectric member includes a window therein between said first and second conductive elements.

In one embodiment, the dielectric member includes first and second parts, the first conductive member being disposed on the first part and the second part comprising cylindrical end member joined to said first part and said second conductive element comprising an annular conductive member recessed within said second part. As above, in this embodiment, the dielectric member preferably includes a window located between the first and second conductive elements.

In accordance with a further aspect of the invention, there is provided a capacitor module system for creating a thrust, said system comprising: a capacitor module comprising a first conductive element having a first geometry; a second conductive element axially spaced from said first conductive element and having a geometry of smaller axial extent than the geometry of said first conductive element; and a dielectric element including a first frusto-conical portion disposed between said first conductive element and said second conductive element so as to form the capacitor module, said dielectric member including a further portion having an outer surface on which said first conductive element is disposed; and, a high voltage source, having first and second terminals connected respectively to said first and second conductive elements, for applying a high voltage to said conductive elements of sufficient value to create a thrust force on said module inducing movement thereof.

Preferably, the further portion of the dielectric member is of a frusto-conical shape.

In one embodiment, the first portion of the dielectric member comprises first and second frusto-conical portions joined end to end.

Advantageously, the second conductive element is of a frustoconical shape.

Further features and advantages of the present invention will be set forth in, or apparent from, the detailed description of preferred embodiments thereof which follows.

DESCRIPTION OF THE PREFERRED EMBODIMENTS

Figure 1:
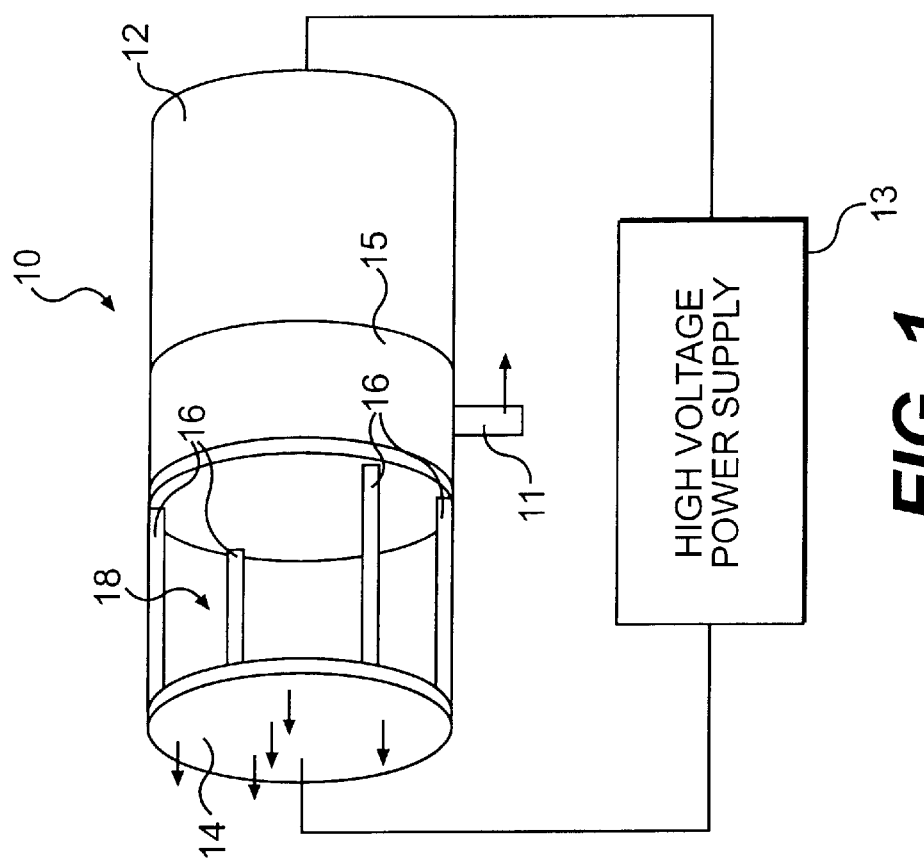
FIG. 1 is a perspective view of an asymmetrical capacitor module in accordance with a first embodiment of the invention.

Referring to FIG. 1, there is shown a perspective view of a two dimensional, asymmetrical capacitor module 10 in accordance with a first embodiment of the invention. The capacitor module 10 is very similar in outward appearance to that disclosed in the above-identified application Ser. No. 09/520,817, and includes, at one end thereof, a cylinder 12 made of copper or another highly conductive material. The cylinder 12 can be solid or hollow. The module 10 also includes, axially spaced from cylinder 12 at the other end of module 10, a cylindrical conductive disk 14 made of copper or another highly conductive material. In the embodiment of FIG. 1, a cylindrical dielectric element 15, which is made of Kapton or another high voltage dielectric material, is affixed to cylinder 12 on the side of cylinder 12 closest to the cylindrical disk 14. A plurality of dielectric rods or struts 16 are provided which join the disk 14 and the dielectric cylinder 15. The dielectric rods 16 are attached, at one end thereof, about the periphery of the dielectric cylinder 15. These dielectric rods 16 extend axially across an air gap 18 and are attached, at the other end thereof, to the disk 14. A support post 11 extends outwardly from the cylindrical dielectric element 15. Support post 11 is preferably made of Kapton or another high voltage dielectric material.

A high voltage supply 13 is also provided. The high voltage supply 13 has first and second terminals respectively connected to the flat cylindrical disk 14 and the cylinder 12 which form the axial capacitor plates of the capacitor module 10. The voltage of the voltage supply 13 is such to charge the capacitor module 10 to a sufficiently high potential to cause a thrust or force to be generated which causes axial movement of the capacitor module 10.

The only difference between the embodiment of FIG. 1 and one of those disclosed in the above-identified application is that, in the latter, disk 14 is made completely of copper or another suitable material, while, in the embodiment of FIG. 1, disk 14 is made of an insulator including a plurality of highly conducting (e.g., copper) needles or rods penetrating the insulator, as is indicated very generally by the multiple arrows shown in FIG. 1.

Figure 2:
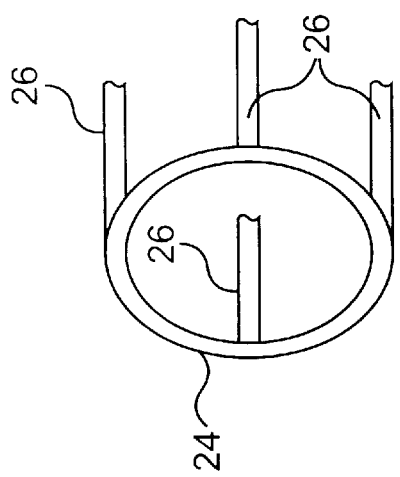
FIG. 2 is a broken away perspective view of an asymmetrical capacitor module in accordance with a further embodiment of the invention.

Referring to FIG. 2, wherein corresponding elements have been given the same reference numerals with a "2" replacing the "1" in the tens place, a further embodiment of the invention is shown. In this embodiment disk 14 is replaced by a ring or annulus preferably in the form of a fine wire 24 made of copper or another highly conductive material.

Figure 3:
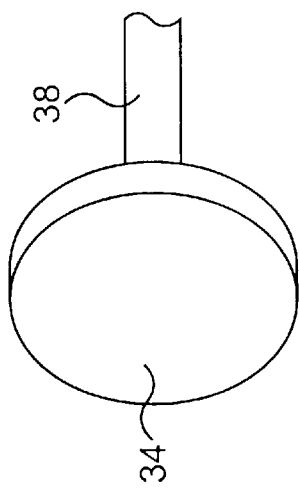
FIG. 3 is a broken away perspective view of an asymmetrical capacitor module in accordance with another embodiment of the invention.

Referring to FIG. 3, wherein corresponding elements have been given the same reference numerals with a "3" replacing the "1" in the tens place, a further embodiment is shown, wherein a disk 34, preferably made as described above in connection with FIG. 1, is supported by a single central strut 30 made of high voltage dielectric material.

Figure 4C:
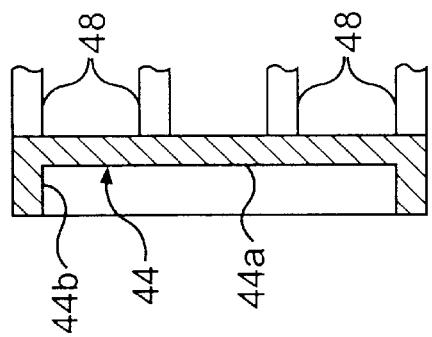
FIGS. 4(a), 4(b) and 4(c) are a perspective, end elevational and cross-sectional view, respectively, of yet another embodiment of the asymmetrical capacitor module of the invention.
Figure 4B:
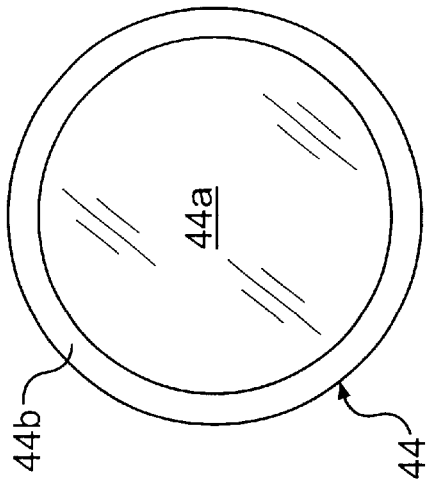
Figure 4A:
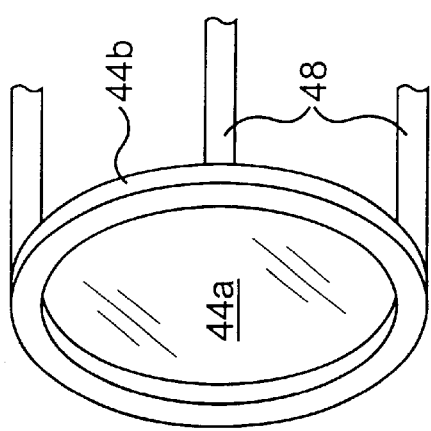

Referring to FIGS. 4(a), 4(b) and 4(c), wherein corresponding elements have been given the same reference numerals as in FIG. 1 with a "4" replacing the "1" in the tens position, a further embodiment is shown wherein a disk 44 is provided which is hollowed out, i.e., the disk 44 comprises a very shallow cup-shaped member with a thin base portion 44a and a cylindrical side wall 44b, as is perhaps best seen in FIG. 4(c).

Figure 5:
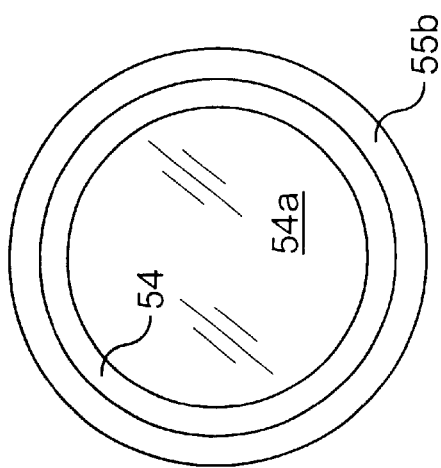
FIG. 5 is an end elevational view of an asymmetrical capacitor module in accordance with still another embodiment of the invention.

Referring to FIG. 5, wherein corresponding elements have been given the same reference numerals as in FIG. 1 with a "5" replacing the "1" in the tens place, a further embodiment is shown wherein a ring or annular conductor 54, similar to that of FIG. 2, is employed. In this embodiment, ring conductor 54 is mounted within and partially encapsulated by a dielectric disk 54a and an outer dielectric ring or annulus 54b. The mounting support for ring conductor 54 may be a plurality of struts (not shown) similar to those of, e.g., FIG. 2.

Figure 6:
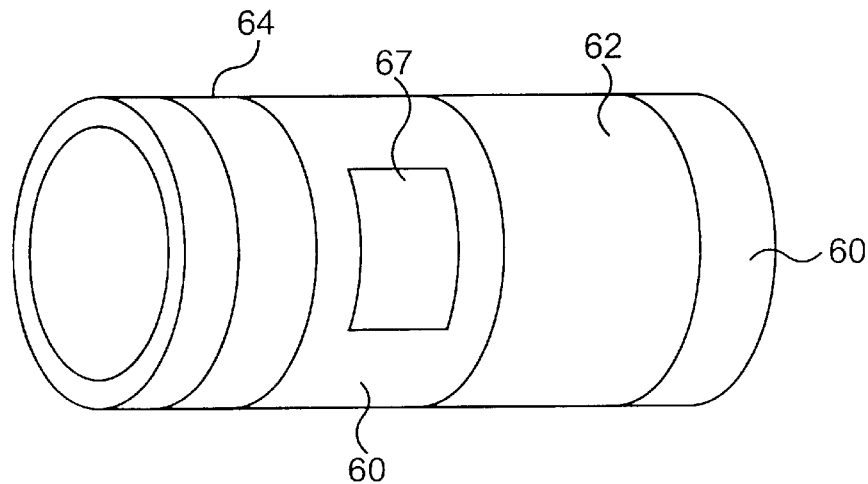
FIG. 6 is a perspective elevational view of a further embodiment of an asymmetrical capacitor module according to the invention.

Referring to FIG. 6, wherein the same basic numbering scheme is employed, there is shown a further embodiment of the invention, which provides improvement in performance and affords a weight reduction as well as a reduction in arcing. In this embodiment, the rear conductor 62 and a front conductor 64 are both formed by respective conductive coatings on the surface of a hollow dielectric sleeve or cylinder 60 which extends well beyond conductors 62 and 64 at both ends thereof. Although the basic construction need not include this feature, arc reduction is effected by providing a window 67 in the portion of hollow sleeve 60 between conductive surfaces 62 and 64.

Figure 7A:
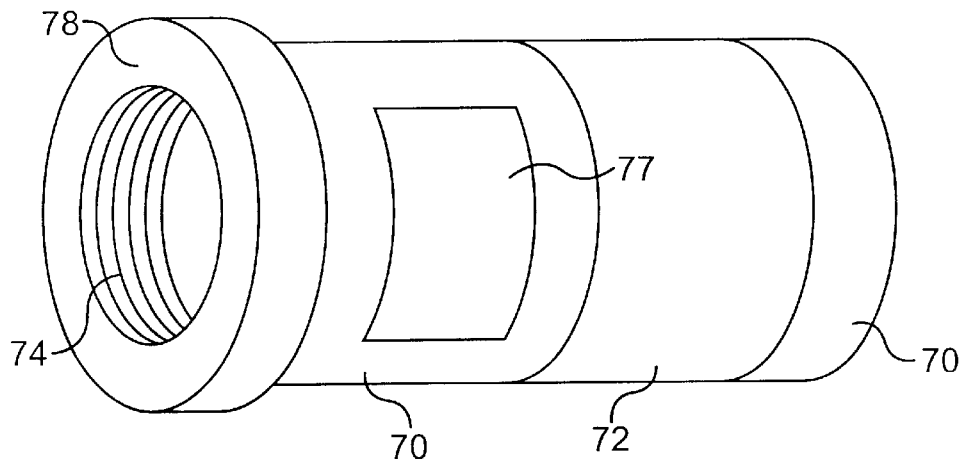
FIGS. 7(a) and 7(b) are a perspective view and an end elevational view, respectively, of another embodiment of an asymmetrical capacitor module according to the invention.
Figure 7B:
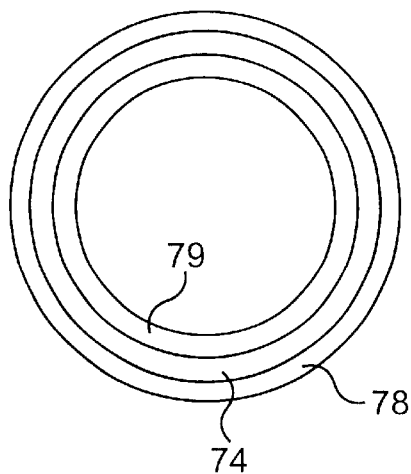

A similar embodiment to that of FIG. 6 is shown in FIGS. 7(a) and 7(b) wherein the same basic numbering scheme is again used. As in the embodiment of FIG. 6, the rear conductor 72 is formed of a conductive coating on the surface of a dielectric sleeve 70 and a window 77 is also provided. However, in this embodiment, the front conductor 74 is formed by a recessed conducting ring located within an outer cylindrical or annular dielectric member 78 affixed to the front end of sleeve 70 so that, again, the dielectric member 78 extends well beyond conductor 74. An inner dielectric ring or annulus 79 is disposed concentric with, and within, recessed conducting ring 74.

Figure 8:
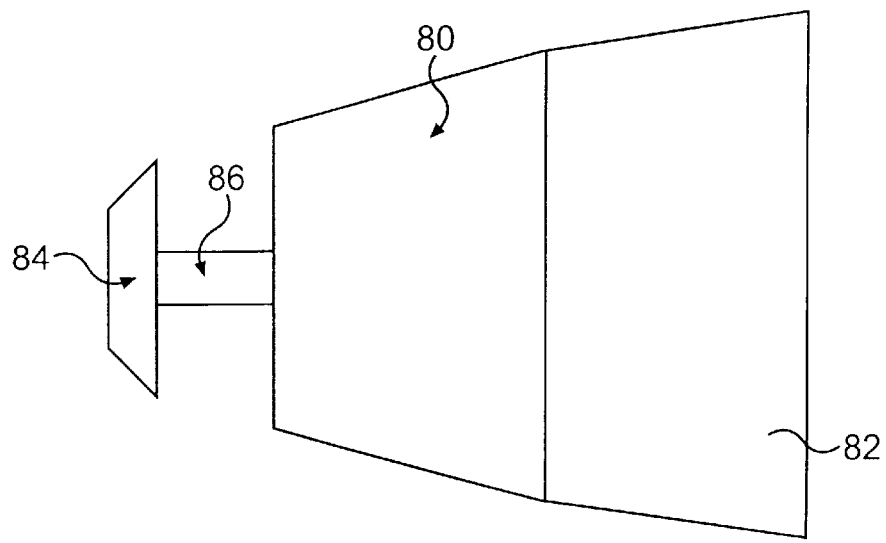
FIG. 8 is a side elevational view of another embodiment of the invention.

Yet another embodiment of the invention is shown in FIG. 8, wherein the same numbering scheme is used. In this embodiment, a dielectric sleeve or body 80 of a frustoconical configuration is employed. A rear conductor 82 is provided by a conducting surface on a less severely tapered portion of body 80. A separate front conductor 84 is also formed by a conducting surface or coating and is also of frustoconical shape. A central dielectric strut or post 86 supports front conductor 84.

Figure 9:
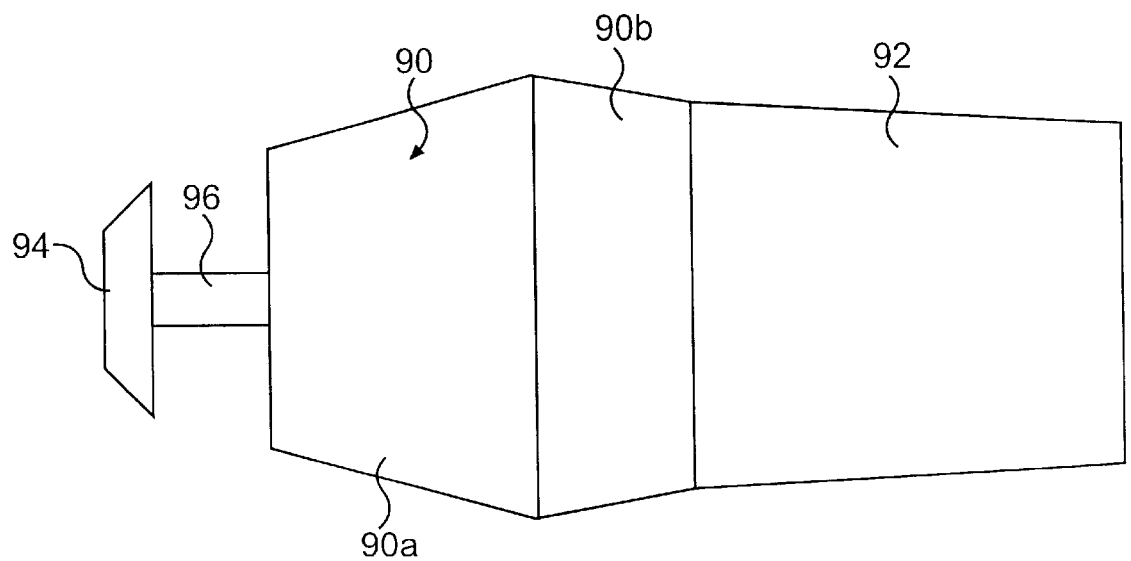
FIG. 9 is a side elevational view of a further embodiment of the invention.

Referring to FIG. 9, an embodiment is shown which is similar to that of FIG. 8 but in which body a dielectric 90 includes two frustoconical portions 90a and 90b joined together at the respective bases thereof. A rear conducting surface 92 is provided on a third less severely tapered portion of dielectric body 90. The front conductor 94 and supporting strut 96 are similar to that of FIG. 8.

Although the invention has been described above in relation to preferred embodiments thereof, it will be understood by those skilled in the art that variations and modifications can be effected in these preferred embodiments without departing from the scope and spirit of the invention.

What is claimed is:

1. A capacitor module system for creating a thrust force, said system comprising:
   a capacitor module comprising a first conductive element having a first geometry; a second conductive element axially spaced from said first conductive element and having a geometry of smaller axial extent than the geometry of said first conductive element; and a dielectric element disposed between said first conductive element and said second conductive element so as to form the capacitor module; and,
   a high voltage source, having first and second terminals connected respectively to said first and second conductive elements, for applying a high voltage to said conductive elements of sufficient value to create a thrust force on said module inducing movement thereof, said second conductive element having a diameter substantially equal to that of said first conductive element and being of a shape defining a plane as viewed in axial cross section while being of reduced weight compared with a copper disk of the same diameter and shape.

2. The apparatus of claim 1 wherein the second conductive element comprises an insulator including a plurality of conductive elements therein.

3. The apparatus of claim 1 wherein the second conductive element comprises a circular conductive wire member.

4. The apparatus of claim 1 wherein the second conductive element comprises a cup-shaped conductive member having a recessed central portion.

5. The apparatus of claim 1 wherein the second conductive element comprises an annular conductive member disposed within an outer dielectric annulus.

6. The apparatus of claim 5 wherein said second conductive element further includes a central disk-shaped dielectric member.

7. The apparatus of claim 1 wherein said first conductive element is of a cylindrical shape.

8. The apparatus of claim 1 further comprising a central dielectric support strut for supporting said second conductive element in spaced relation to said dielectric element.

9. A capacitor module system for creating a thrust force, said system comprising:
   a capacitor module comprising a cylindrical dielectric member having an outer surface; a first conductive element disposed on the outer surface of said dielectric member and having a cylindrical geometry; a second conductive element disposed on said dielectric member in axially spaced relation to said first conductive element so as to form the capacitor module and having a cylindrical geometry of smaller axial extent than said first conductive element; said dielectric member extending axially beyond said first conductive element at one end of said dielectric member and extending axially beyond said second conductive element at the opposite end of said dielectric member; and
   a high voltage source, having first and second terminals connected respectively to said first and second conductive elements, for applying a high voltage to said conductive elements of sufficient value to create a thrust force on said module inducing movement thereof.

10. The apparatus of claim 9 wherein the dielectric member includes a window therein between said first and second conductive elements.

11. The apparatus of claim 9 wherein said dielectric member includes first and second parts, said first conductive member being disposed on said first part and said second part comprising a cylindrical end member joined to said first part and said second conductive element comprising an annular conductive member recessed within said second part.

12. The apparatus of claim 11 wherein the dielectric member includes a window located between said first and second conductive elements.

13. A capacitor module system for creating a thrust force, said system comprising:
   a capacitor module comprising a first conductive element having a first geometry; a second conductive element axially spaced from said first conductive element and having a geometry of smaller axial extent than the geometry of said first conductive element; and a dielectric element including a first frusto-conical portion disposed between said first conductive element and said second conductive element so as to form the capacitor module, said dielectric member including a further portion having an outer surface on which said first conductive element is disposed; and, a high voltage source, having first and second terminals connected respectively to said first and second conductive elements, for applying a high voltage to said conductive elements of sufficient value to create a thrust force on said module inducing movement thereof.

14. The apparatus of claim 13 wherein said further portion of said dielectric member is of a frusto-conical shape.

15. The apparatus of claim 13 wherein the first portion of said dielectric member comprises first and second frusto-conical portions joined end to end.

16. The apparatus of claim 13 wherein said second conductive element is of a frusto-conical shape.

* * * * *